US012576707B2

(12) United States Patent　　　　　(10) Patent No.:　US 12,576,707 B2
Jeon et al.　　　　　　　　　　　　　(45) Date of Patent:　　Mar. 17, 2026

(54) CORNER MODULE APPARATUS

(71) Applicant: HYUNDAI MOBIS CO., LTD., Seoul (KR)

(72) Inventors: Jae Woong Jeon, Yongin-si (KR); Jin Wook Joo, Yongin-si (KR)

(73) Assignee: Hyundai Mobis Co., Ltd., Seoul (KR)

( * ) Notice:　Subject to any disclaimer, the term of this patent is extended or adjusted under 35 U.S.C. 154(b) by 279 days.

(21) Appl. No.: 18/486,532

(22) Filed:　Oct. 13, 2023

(65)　　　　　Prior Publication Data

US 2024/0300316 A1　　Sep. 12, 2024

(30)　　　Foreign Application Priority Data

Mar. 6, 2023　(KR) ........................ 10-2023-0029171
Mar. 6, 2023　(KR) ........................ 10-2023-0029172

(51) Int. Cl.
　　*B60K 7/00*　　　(2006.01)
　　*B60G 7/00*　　　(2006.01)
　　*B60G 15/06*　　(2006.01)
　　*B62D 5/04*　　　(2006.01)
　　*B62D 7/18*　　　(2006.01)
(52) U.S. Cl.
　　CPC ........... *B60K 7/0007* (2013.01); *B60G 7/001* (2013.01); *B60G 15/06* (2013.01); *B62D 5/0418* (2013.01); *B62D 7/18* (2013.01); *B60K 2007/0038* (2013.01); *B60K 2007/0092* (2013.01)

(58) Field of Classification Search
　　CPC .......... B60K 7/0007; B60K 2007/0038; B60K 2007/0092; B62D 5/0418; B62D 7/18; B60G 7/001; B60G 15/06
　　See application file for complete search history.

(56)　　　　　References Cited

U.S. PATENT DOCUMENTS

| 10,940,885 | B2 | 3/2021 | Xu et al. |
| 10,994,580 | B1 * | 5/2021 | Ryshavy ................ B62D 17/00 |
| 2005/0067805 | A1 * | 3/2005 | Kim ......................... B62D 7/18 |
| | | | 280/93.512 |
| 2006/0266574 | A1 | 11/2006 | Lundmark |
| 2020/0207405 | A1 | 7/2020 | Kuribayashi |
| 2023/0051754 | A1 | 2/2023 | Chang et al. |

FOREIGN PATENT DOCUMENTS

| EP | 4 223 564 A2 | 8/2023 |
| KR | 10-2019-0041855 A | 4/2019 |

OTHER PUBLICATIONS

Extended European search report issued on Apr. 23, 2024, in counterpart European Patent Application No. 23204857.9 (20 pages).

* cited by examiner

*Primary Examiner* — Lori Wu
(74) *Attorney, Agent, or Firm* — NSIP Law

(57)　　　　　ABSTRACT

A corner module apparatus includes a drive unit installed inside a wheel to provide driving power to the wheel, a steering knuckle connected to the drive unit, a stationary shaft to support the steering knuckle so that the steering knuckle is rotatable, an actuator fixed to the steering knuckle to generate a rotational force, and a power transmission member connected to the actuator to rotate the steering knuckle about the stationary shaft in conjunction with the rotational force generated by the actuator.

20 Claims, 15 Drawing Sheets

600

600

CORNER MODULE APPARATUS

CROSS-REFERENCE TO RELATED APPLICATION

This application claims priority from and the benefit of Korean Patent Application Nos. 10-2023-0029171 and 10-2023-0029172, filed on Mar. 6, 2023, which are hereby incorporated by reference for all purposes as if set forth herein.

BACKGROUND

Technical Field

Exemplary embodiments of the present disclosure relate to a corner module apparatus, and more particularly, to a corner module apparatus, in which driving, braking, steering, suspension systems are integrated.

Discussion of the Background

In general, an electric vehicle refers to an environmental-friendly vehicle that emits no exhaust gas. The electric vehicle is equipped with a high-voltage battery configured to supply energy to drive the electric vehicle, and a driving motor configured to generate a rotational force from electric power outputted from the high-voltage battery. The electric vehicle travels as rotational power of the motor is transmitted to a wheel through a driving shaft.

Recently, in-wheel motor vehicles have been in the limelight. In the in-wheel motor vehicle, intermediate power transmission devices, such as a speed reducer or a differential gear, may be excluded, which may reduce a weight of the vehicle. In the in-wheel motor vehicle, a motor is directly installed in a wheel in consideration of an advantage of reducing a loss of energy during a power transmission process, such that power of the motor is transmitted directly to the wheel. Furthermore, the development has also been actively conducted on a four-wheel independent steering system in which braking, steering, suspension systems as well as a driving system are integrated.

In the above-mentioned independent steering system, an internal space of the wheel is narrowed in comparison with that in the related art because the in-wheel motor is installed inside the wheel. For this reason, the suspension package is disadvantageous, and it is difficult to drive the independent steering system because of an increase in rotation radius.

The background technology of the present disclosure is disclosed in Korean Patent Application Laid-Open No. 10-2019-0041855 (published on Apr. 23, 2019 and entitled 'Steering System for an In-Wheel Motor Vehicle).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments are directed to a corner module apparatus, which is capable of sufficiently ensuring a steering space between a vehicle body and a wheel and reducing a kingpin offset.

In a general aspect, a corner module apparatus includes: a drive unit installed inside a wheel and configured to provide driving power to the wheel; a steering knuckle connected to the drive unit; a stationary shaft configured to support the steering knuckle so that the steering knuckle is rotatable; an actuator fixed to the steering knuckle and configured to generate a rotational force; and a power transmission member connected to the actuator and configured to rotate the steering knuckle about the stationary shaft in conjunction with the rotational force generated by the actuator.

A central axis of the stationary shaft may be inclined with respect to a ground surface.

When the steering knuckle rotates, the actuator may revolve around a central axis of the stationary shaft.

A central axis of the actuator may be spaced apart from the central axis of the stationary shaft.

The central axis of the actuator may be parallel with the central axis of the stationary shaft.

The power transmission member may include: a rotary shaft connected to the actuator and configured to rotate by receiving the rotational force from the actuator; and a conversion member disposed between the stationary shaft and the rotary shaft and configured to convert a rotational motion of the rotary shaft into a rotational motion of the steering knuckle.

The conversion member may include: a first pulley fixed to the stationary shaft; a second pulley spaced apart from the first pulley and configured to rotate together with the rotary shaft; and a belt disposed to surround the first pulley and the second pulley and having an inner surface that engages with an outer surface of the first pulley and an outer surface of the second pulley.

The corner module apparatus may further include: a knuckle bearing disposed between the steering knuckle and the stationary shaft and configured to guide a rotation of the steering knuckle relative to the stationary shaft.

The corner module apparatus may further include: a suspension arm disposed between a vehicle body and the steering knuckle and configured to support the steering knuckle on the vehicle body; and a shock absorber module connected to the suspension arm and configured to absorb impact applied from a road surface.

The shock absorber module may include: a damper extending in a height direction of the vehicle body and configured to be extendable and contractible in a length direction thereof; and a leaf spring extending in a width direction of the vehicle body and configured to be elastically deformable.

In another general aspect, a corner module apparatus may include: a drive unit installed inside a wheel and configured to provide driving power to the wheel; a steering knuckle connected to the drive unit; a stationary shaft configured to support the steering knuckle so that the steering knuckle is rotatable; a steering unit connected to the steering knuckle and configured to rotate the steering knuckle relative to the stationary shaft; a first suspension arm disposed between a vehicle body and the steering knuckle and configured to support a first side of the steering knuckle on the vehicle body; a second suspension arm spaced apart from the stationary shaft and configured to support a second side of the steering knuckle on the vehicle body; and a connection member disposed between the second suspension arm and the stationary shaft and configured to connect the second suspension arm to the stationary shaft.

The connection member may include: a first connection member connected to the stationary shaft; and a second connection member extending from the first connection member and connected to the second suspension arm.

The first connection member may include: a first body disposed to face the second side of the steering knuckle; an insertion hole formed through the first body so that the stationary shaft is inserted into the insertion hole; and a slit formed through the first body and extending toward the insertion hole from a peripheral surface of the first body.

The first body may be elastically deformable.

A cross-sectional shape of the insertion hole may be any one of a polygonal shape and an elliptical shape.

The first connection member may further include an adjustment member movably connected to the first body and configured to adjust a width of the slit depending on a movement direction thereof.

The first body may include a first end and a second end disposed to face each other with the slit interposed therebetween, and the adjustment member may include: an adjustment rod configured to penetrate the first end and the slit and be inserted into the second end; an adjustment head disposed at a first side of the adjustment rod and configured to press the first end toward the second end when the adjustment rod is inserted into the second end; and an adjustment nut disposed at a second side of the adjustment rod and configured to prevent the adjustment rod from separating from the second end.

The adjustment nut may be detachably coupled to the adjustment rod.

The second connection member may include: a second body extending from the first connection member in a width direction of the vehicle body; and a fastening hole formed through the second body and connected to the second suspension arm.

The second suspension arm may include; a first link connected to a first side of the fastening hole; and a second link spaced apart from the first link with the second body interposed therebetween, the second link being connected to a second side of the fastening hole.

According to the corner module apparatus according to the present disclosure, the actuator configured to rotate the steering knuckle is coupled directly to the steering knuckle. Therefore, in comparison with the case in which the actuator is coupled to a separate structure extending from the vehicle body or the like, a larger steering space may be ensured between the wheel and the vehicle body, and a steering range of the wheel may be expanded.

In addition, according to the corner module apparatus according to the present disclosure, the central axis of the actuator is spaced apart from the central axis of the stationary shaft, which may prevent the kingpin axis from being excessively distant from the wheel because of the volume of the actuator.

In addition, according to the corner module apparatus according to the present disclosure, the kingpin axis and the suspension axis are separated by the connection member in the width direction of the vehicle body. Therefore, the stationary shaft may be positioned at a point closer to the wheel, which may reduce the kingpin offset value and improve the traveling stability of the vehicle.

Other features and aspects will be apparent from the following detailed description, the drawings, and the claims.

DETAILED DESCRIPTION

Figure 1:
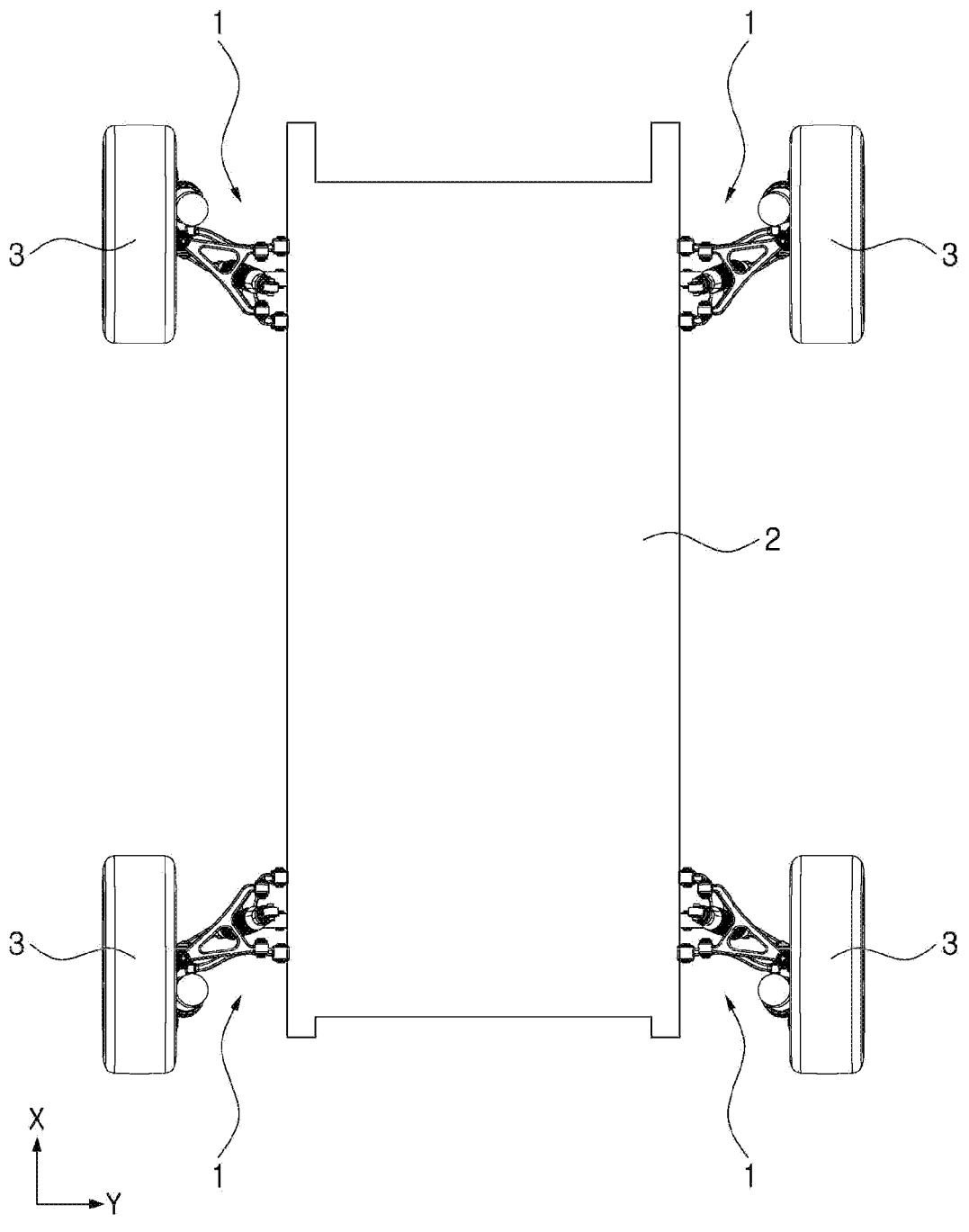
FIG. 1 is a view schematically illustrating a state in which a corner module apparatus according to an embodiment of the present disclosure is installed.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims.

Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a corner module apparatus will be described below with reference to the accompanying drawings through various exemplary embodiments.

FIG. 1 is a view schematically illustrating a state in which a corner module apparatus according to an embodiment of the present disclosure is installed.

With reference to FIG. 1, a plurality of corner module apparatuses 1 for a vehicle according to the present embodiment may be provided, and the plurality of corner module apparatuses 1 may each be independently installed between a wheel 3 and a vehicle body 2. The corner module apparatuses 1 for a vehicle may each serve as a component for independently adjusting a steering angle of the wheel 3 by using autonomous driving power.

The vehicle body 2 may be configured to define an overall framework, external appearance, or the like of the vehicle and exemplified by a chassis frame, a body frame, a subframe, or an assembly thereof. The specific shape of the vehicle body 2 is not limited to the shape illustrated in FIG. 1 but may be designed and modified in various shapes depending on the type of vehicle.

Figure 2:
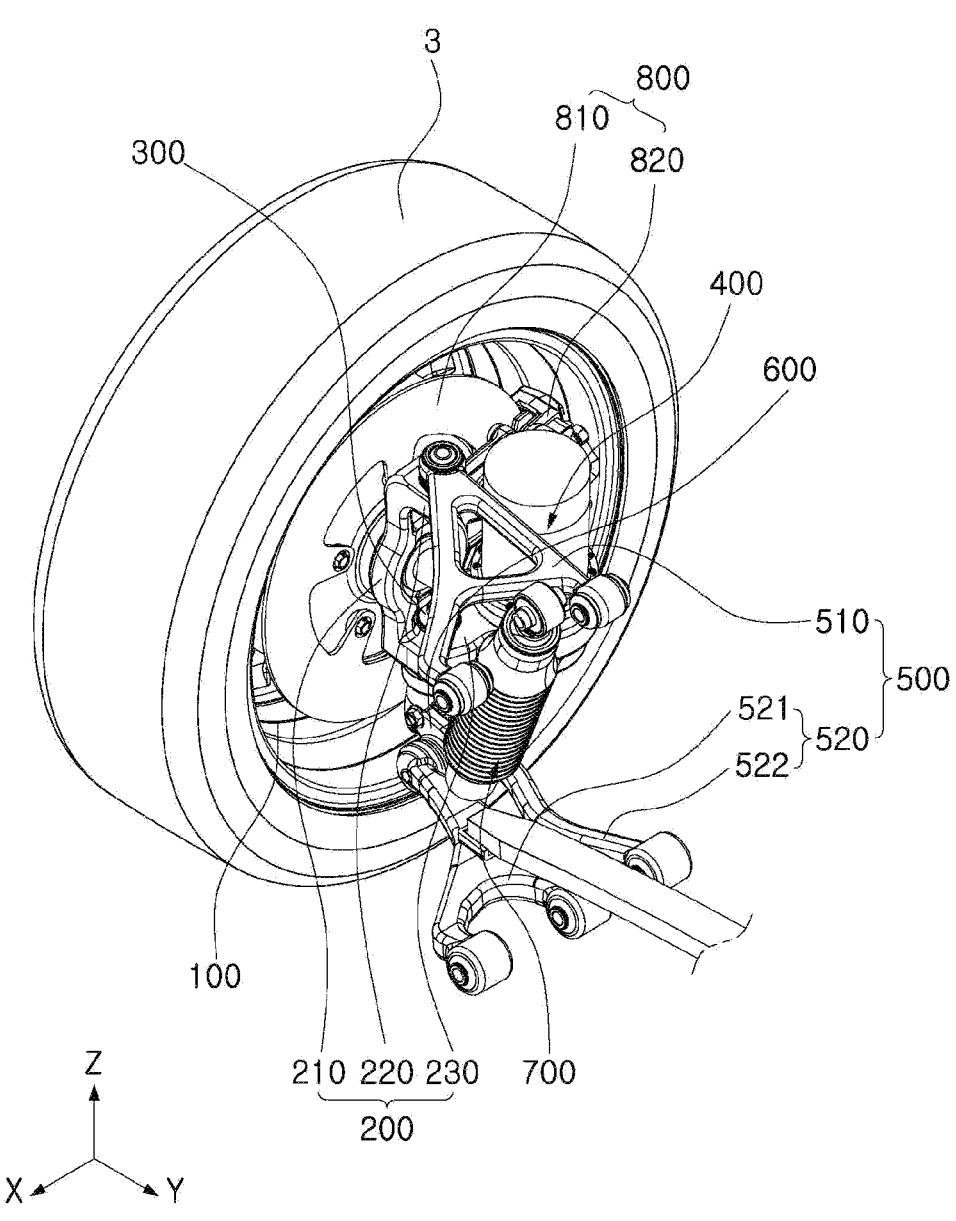
FIG. 2 is a perspective view schematically illustrating a configuration of the corner module apparatus according to the embodiment of the present disclosure.
Figure 3:
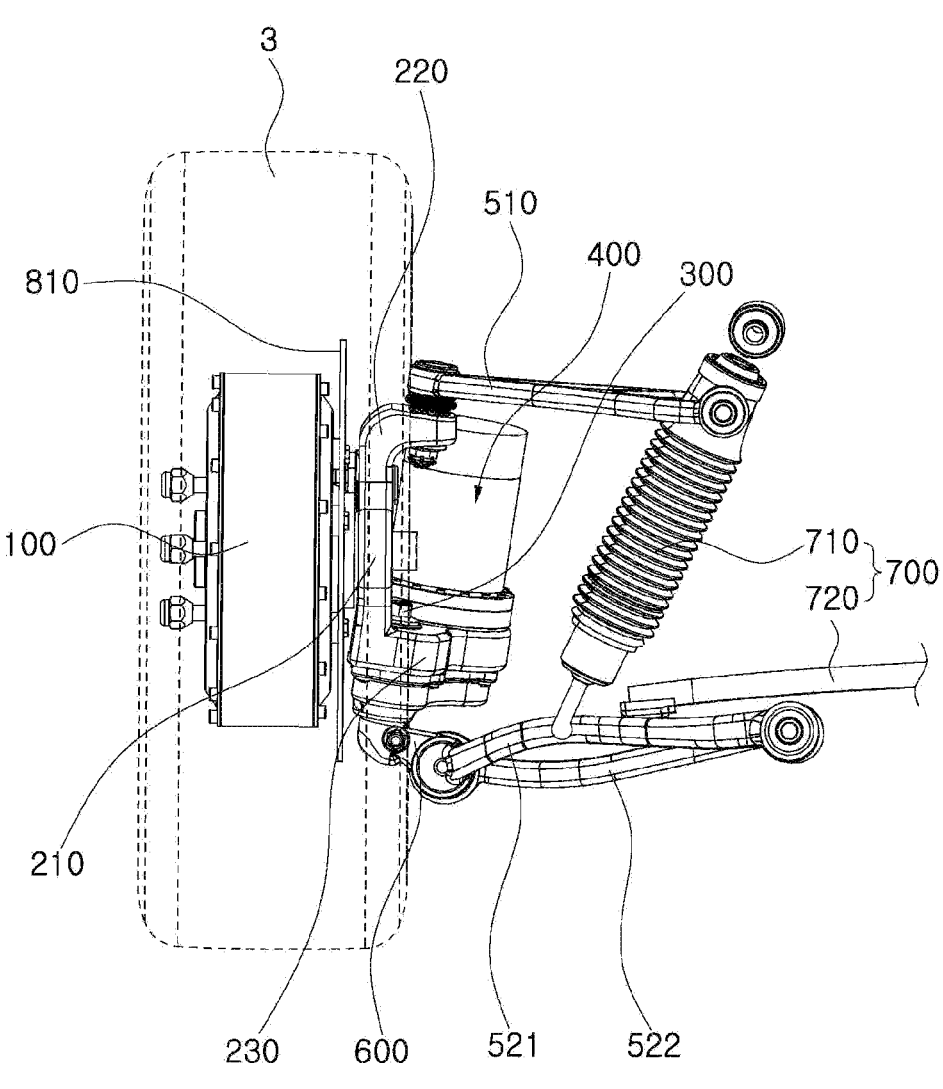
FIG. 3 is a front view schematically illustrating the configuration of the corner module apparatus according to the embodiment of the present disclosure.
Figure 3:
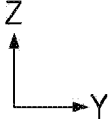
Figure 4:
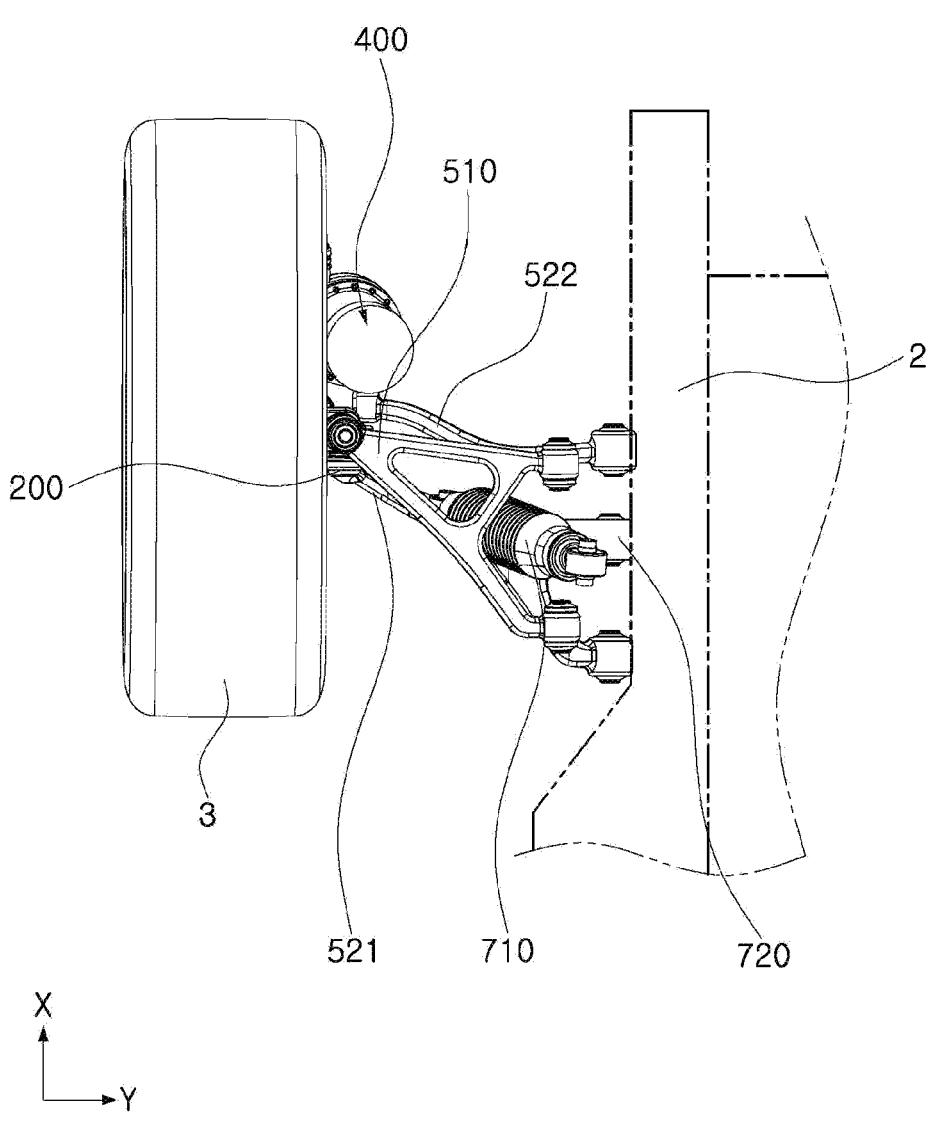
FIG. 4 is a top plan view schematically illustrating the configuration of the corner module apparatus according to the embodiment of the present disclosure.
Figure 5:
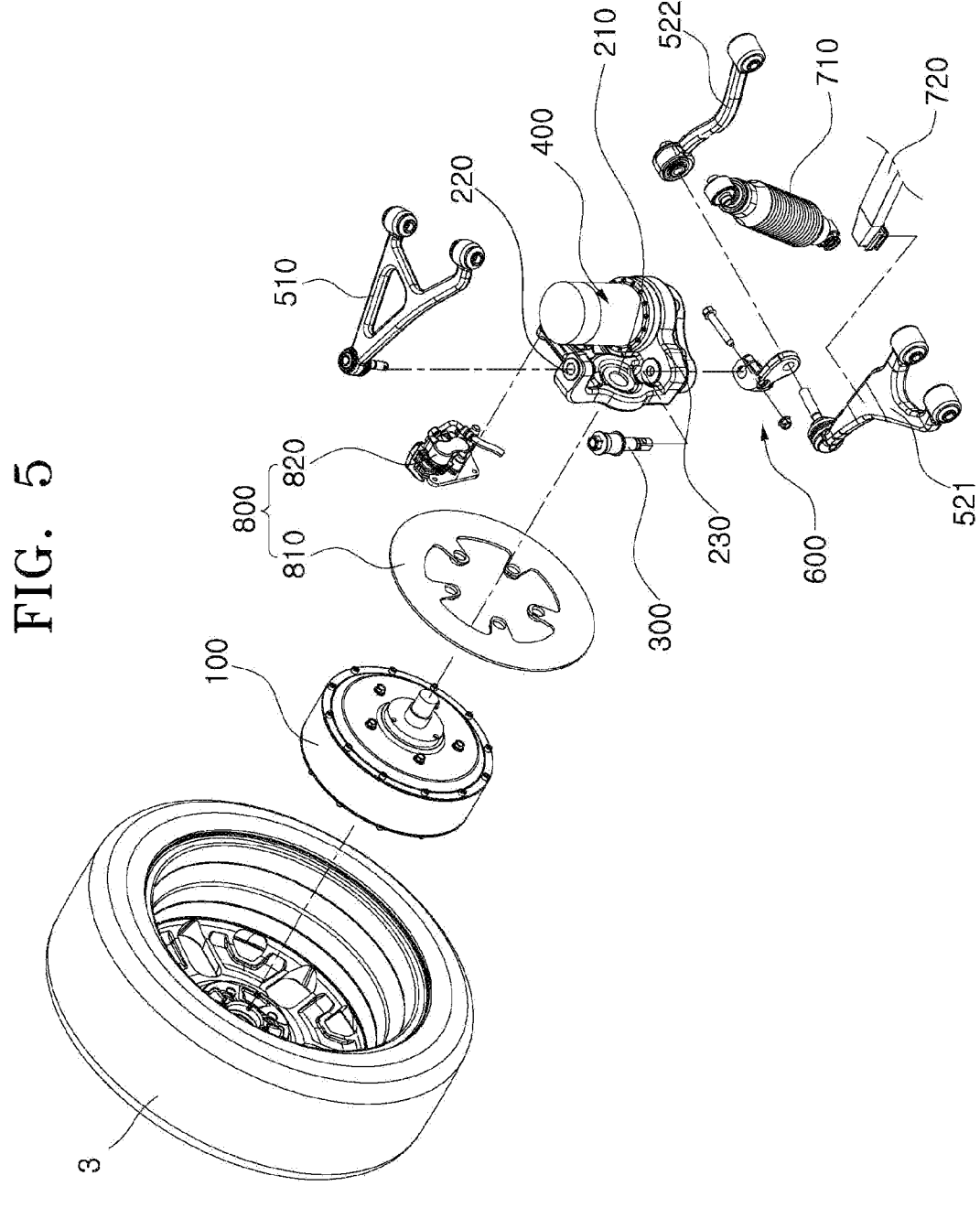
FIG. 5 is an exploded perspective view schematically illustrating the configuration of the corner module apparatus according to the embodiment of the present disclosure.

FIG. 2 is a perspective view schematically illustrating a configuration of the corner module apparatus according to the embodiment of the present disclosure, FIG. 3 is a front view schematically illustrating the configuration of the corner module apparatus according to the embodiment of the present disclosure, FIG. 4 is a top plan view schematically illustrating the configuration of the corner module apparatus according to the embodiment of the present disclosure, and FIG. 5 is an exploded perspective view schematically illustrating the configuration of the corner module apparatus according to the embodiment of the present disclosure.

An example will be described in which a length direction, a width direction, and a height direction of the vehicle body 2, which will be described below, are respectively directions parallel to X-axis, Y-axis, and Z-axis directions based on FIGS. 1 and 2.

With reference to FIGS. 1 to 5, the corner module apparatus 1 for a vehicle according to the present embodiment may include a drive unit 100, a steering knuckle 200, a stationary shaft 300, and a steering unit 400.

The drive unit 100 is installed inside the wheel 3 of the vehicle and rotates the wheel 3 by providing driving power to the wheel 3.

The drive unit 100 according to the embodiment may be exemplified by various types of in-wheel motors each including a stator fixed inside the wheel 3 and configured to form a magnetic field by receiving electric power from a battery of the vehicle, and a rotor rotatably installed inside the wheel 3 and configured to rotate the wheel 3 by means of an electromagnetic interaction with the stator. The stator and the rotor have central axes positioned on the same line as a central axis of the wheel 3. The stator and the rotor may be disposed inside the wheel 3 and stacked on each other on a concentric circle.

The steering knuckle 200 is connected to the drive unit 100 and serves as a component for supporting the steering unit 400 to be described below and transmitting a steering force, which is generated by the steering unit 400, to the wheel 3. The steering knuckle 200 may be manufactured by forming a metallic material by casting or the like in order to ensure sufficient rigidity.

The steering knuckle 200 according to the present embodiment may include a knuckle body 210, a first extension portion 220, and a second extension portion 230.

The knuckle body 210 defines an external appearance of a central portion of the steering knuckle 200 and supports the first extension portion 220 and the second extension portion 230, which will be described below, as a whole.

The knuckle body 210 according to the present embodiment may be disposed to face the drive unit 100 in the width direction of the vehicle body 2. The knuckle body 210 may be coupled to the stator of the drive unit 100 by welding, bolting, or the like. The knuckle body 210 may support the rotor of the drive unit 100 by means of a wheel bearing (not illustrated) so that the rotor is rotatable. The specific shape of the knuckle body 210 is not limited to the shape illustrated in FIGS. 1 to 5. The shape of the knuckle body 210 may be variously designed and modified within the technical spirit in which the knuckle body 210 may be coupled to the drive unit 100 and shaped to support the first extension portion 220 and the second extension portion 230.

The first extension portion 220 extends from the knuckle body 210 and defines an external appearance of an upper end of the steering knuckle 200. The first extension portion 220 according to the present embodiment may be formed in the form of a rod extending upward from an upper surface of the knuckle body 210. An end of the first extension portion 220 may extend by a predetermined length in the width direction of the vehicle body 2.

The second extension portion 230 extends from the knuckle body 210 and defines an external appearance of a lower end of the steering knuckle 200. The second extension portion 230 according to the present embodiment may be formed in the form of a plate extending from a lower surface of the knuckle body 210 in a direction intersecting the height direction of the vehicle body 2. The upper and lower surfaces of the second extension portion 230 may be disposed to be inclined at a predetermined angle with respect to the ground surface. Areas of the upper and lower surfaces of the second extension portion 230 may be variously designed and modified depending on sizes or the like of the stationary shaft 300 and the steering unit 400 to be described below.

The stationary shaft 300 is connected to the steering knuckle 200 and supports the steering knuckle 200 so that the steering knuckle 200 is rotatable. That is, the stationary shaft 300 may serve as a component for defining a kingpin axis that is a central steering axis.

The stationary shaft 300 according to the present embodiment may be formed in the form of a rod having a predetermined length. An upper end of the stationary shaft 300 may penetrate the lower end of the steering knuckle 200, more specifically, the second extension portion 230 and be inserted into the second extension portion 230. The steering knuckle 200 may be supported at the upper end of the stationary shaft 300 and rotatable about the central axis of the stationary shaft 300.

A lower end of the stationary shaft 300 may protrude downward from a lower end of the second extension portion 230. The lower end of the steering knuckle 200 may be supported by being connected to the vehicle body 2. In this case, the lower end of the steering knuckle 200 may be indirectly connected to the vehicle body 2 by means of a separate structure or connected directly to the vehicle body 2.

A central axis C1 of the stationary shaft 300 may be disposed to be inclined at a preset angle with respect to the ground surface. More specifically, as illustrated in FIG. 3, a lower end of the central axis C1 of the stationary shaft 300 may be disposed to be directed toward the wheel 3, and an upper end of the central axis C1 may be disposed to be directed toward the vehicle body 2. Therefore, the stationary shaft 300 may generate a restoring force that may restore an angle of the steering knuckle 200 to an initial angle during a process of steering the wheel 3.

A knuckle bearing 301 may be installed between the steering knuckle 200 and the stationary shaft 300 and guide a rotation of the steering knuckle 200 relative to the stationary shaft 300. The knuckle bearing 301 according to the present embodiment may be exemplified by various types of radial bearings each including inner and outer races disposed to define concentric circles, and rolling elements such as balls or needles disposed between the inner and outer races. The knuckle bearing 301 may be disposed between an inner surface of the second extension portion 230, into which the stationary shaft 300 is inserted, and an outer surface of the upper end of the stationary shaft 300. Outer and inner peripheral surfaces of the knuckle bearing 301 may be respectively fixed to the inner surface of the second extension portion 230 and the outer surface of the upper end of the stationary shaft 300. Therefore, the knuckle bearing 301 may reduce a frictional force applied between the steering knuckle 200 and the stationary shaft 300 and suppress vibration, noise, or the like occurring while the steering knuckle 200 rotates.

The steering unit 400 is connected to the steering knuckle 200 and rotates the steering knuckle 200 relative to the stationary shaft 300. That is, the steering unit 400 may serve as a component for changing a steering angle of the wheel 3 by generating a steering force by using autonomous driving power.

Figure 6:
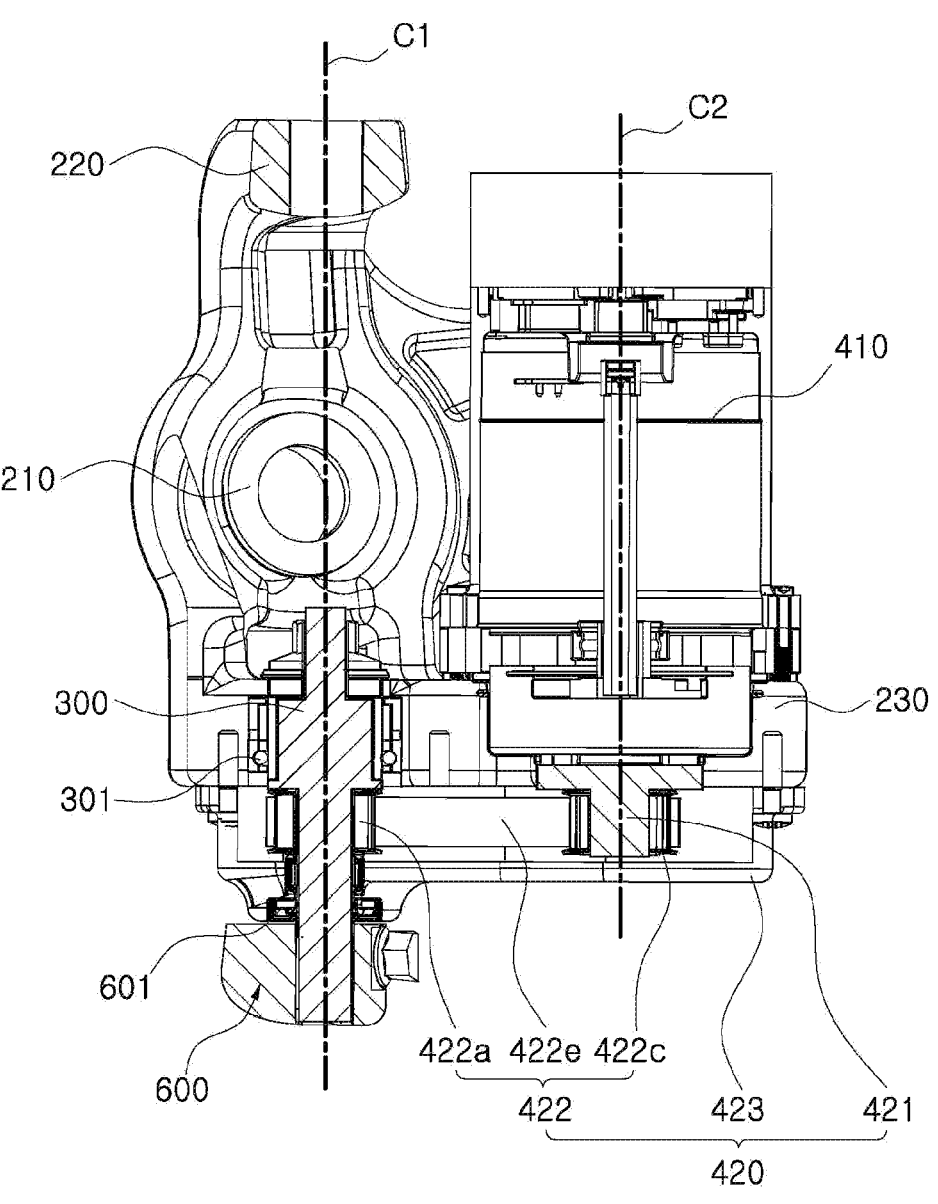
FIG. 6 is a cross-sectional view schematically illustrating a configuration of a steering unit according to the embodiment of the present disclosure.
Figure 7:
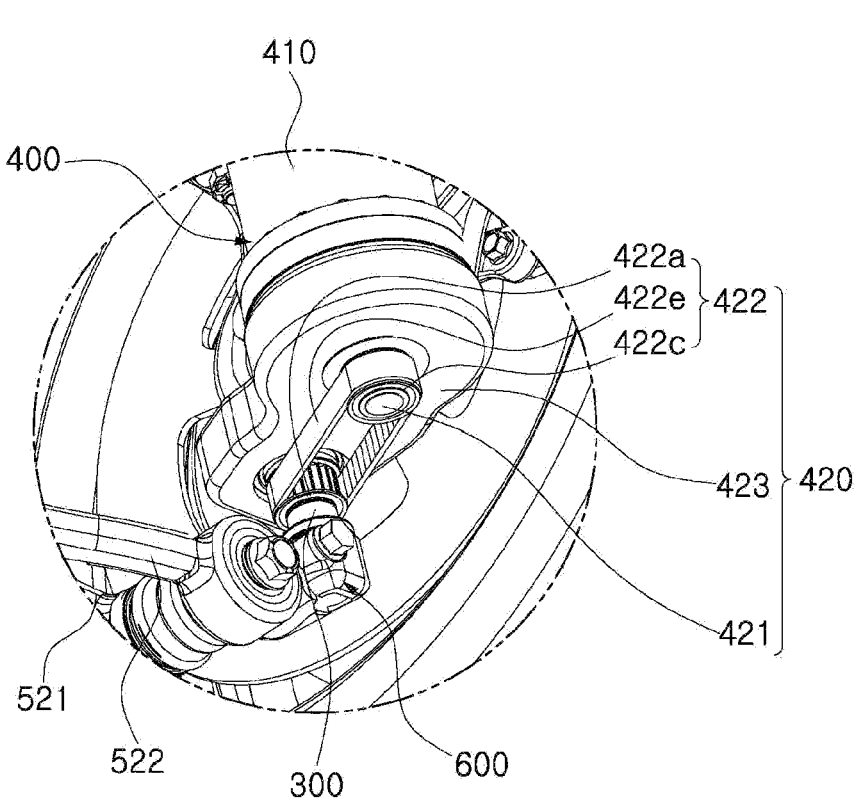
FIG. 7 is a perspective view schematically illustrating the configuration of the steering unit according to the embodiment of the present disclosure.
Figure 8:
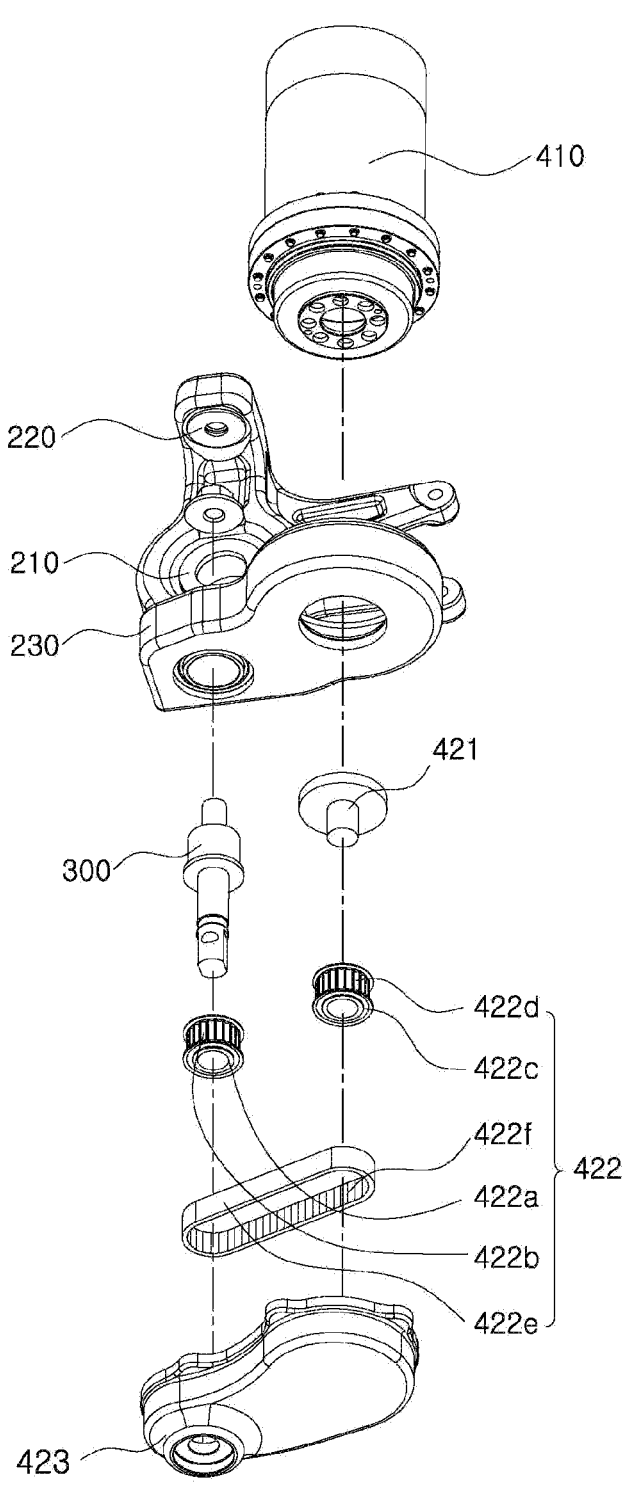
FIG. 8 is an exploded perspective view schematically illustrating the configuration of the steering unit according to the embodiment of the present disclosure.

FIG. 6 is a cross-sectional view schematically illustrating a configuration of a steering unit according to the embodiment of the present disclosure, FIG. 7 is a perspective view schematically illustrating the configuration of the steering unit according to the embodiment of the present disclosure, and FIG. 8 is an exploded perspective view schematically illustrating the configuration of the steering unit according to the embodiment of the present disclosure.

With reference to FIGS. 6 to 8, the steering unit 400 according to the present embodiment may include an actuator 410, and a power transmission member 420.

The actuator 410 is fixed to the steering knuckle 200 and generates a rotational force. The actuator 410 according to the present embodiment may be exemplified by various types of electric motors each configured to generate a rotational force by receiving electric power from a battery (not illustrated) or the like of the vehicle. A lower end of the actuator 410 may be fixed to an upper surface of the second extension portion 230. In this case, the lower end of the actuator 410 may be integrally coupled to the upper surface of the second extension portion 230 by welding or the like or detachably coupled to the upper surface of the second extension portion 230 by bolting or the like. Therefore, in comparison with a case in which the actuator 410 is coupled to a separate structure extending from the vehicle body 2 or the like, a larger steering space may be ensured between the wheel 3 and the vehicle body 2, and a steering range of the wheel 3 may be expanded.

A central axis C2 of the actuator 410 may be disposed to be spaced apart from the central axis C1 of the stationary shaft 300. More specifically, the central axis C2 of the actuator 410 may be disposed to be spaced apart from the central axis C1 of the stationary shaft 300 at a predetermined interval in a radial direction of the stationary shaft 300. The central axis C2 of the actuator 410 may be disposed in parallel with the central axis C1 of the stationary shaft 300. Therefore, in comparison with a case in which the central axis C2 of the actuator 410 is positioned coaxially with the central axis C1 of the stationary shaft 300, it is possible to prevent an increase in interval between the steering knuckle 200 and the wheel 3 caused by a volume thereof and reduce a kingpin offset value because the central axis C1 of the stationary shaft 300 is disposed to be close to the wheel 3.

The power transmission member 420 is connected to the actuator 410 and rotates the steering knuckle 200 about the stationary shaft 300 in conjunction with the rotational force generated by the actuator 410. That is, the power transmission member 420 may serve as a component for transmitting a rotational force, which is generated by the actuator 410, to the steering knuckle 200. When the power transmission member 420 operates, the actuator 410 integrally fixed to the steering knuckle 200 may rotate together with the steering knuckle 200 and revolve around the stationary shaft 300.

The power transmission member 420 according to the present embodiment may include a rotary shaft 421, a conversion member 422, and a casing 423.

The rotary shaft 421 is connected to the actuator 410 and rotated by a rotational force transmitted from the actuator 410. The rotary shaft 421 according to the present embodiment may be formed to have an approximately rod shape. The rotary shaft 421 may be disposed so that a central axis of the rotary shaft 421 is positioned coaxially with the central axis of the actuator 410. An upper end of the rotary shaft 421 may be connected to the lower end of the actuator 410. When the actuator 410 operates, the rotary shaft 421 may receive a rotational force from the actuator 410 and rotate about the central axis clockwise or counterclockwise. A lower end of the rotary shaft 421 may penetrate the second extension portion 230 and protrude downward from the second extension portion 230.

The conversion member 422 is provided between the stationary shaft 300 and the rotary shaft 421 and converts a rotational motion of the rotary shaft 421 into a rotational motion of the steering knuckle 200.

The conversion member 422 according to the present embodiment may include a first pulley 422a, a second pulley 422c, and a belt 422e.

The first pulley 422*a* is fixed to the stationary shaft 300. The first pulley 422*a* according to the present embodiment may be formed to have a hollow ring shape opened at two opposite upper and lower sides thereof. The first pulley 422*a* may be disposed so that a central axis of the first pulley 422*a* is positioned coaxially with the central axis C1 of the stationary shaft 300. The stationary shaft 300 may be inserted into the first pulley 422*a*, and an inner peripheral surface of the first pulley 422*a* may be integrally coupled to an outer peripheral surface of the stationary shaft 300. The stationary shaft 300 is installed so as not to be rotatable about the central axis C1, such that a rotation of the first pulley 422*a* about the central axis may be restricted. A plurality of first teeth 422*b* may protrude from an outer surface of the first pulley 422*a* and be disposed in a circumferential direction of the first pulley 422*a*.

The second pulley 422*c* is disposed to be spaced apart from the first pulley 422*a* and rotates together with the rotary shaft 421. The second pulley 422*c* according to the present embodiment may be formed to have a hollow ring shape opened at two opposite upper and lower sides thereof. The second pulley 422*c* may be disposed so that a central axis of the second pulley 422*c* is positioned coaxially with the central axis of the rotary shaft 421. The rotary shaft 421 may be inserted into the second pulley 422*c*, and an inner peripheral surface of the rotary shaft 421 may be integrally coupled to an outer peripheral surface of the rotary shaft 421. When the rotary shaft 421 rotates, the second pulley 422*c* may rotate about the central axis at the same angular velocity as the rotary shaft 421. A plurality of second teeth 422*d* may protrude from an outer surface of the second pulley 422*c* and be disposed in a circumferential direction of the second pulley 422*c*.

The belt 422*e* is disposed to surround the first pulley 422*a* and the second pulley 422*c* and rotates the steering knuckle 200 in conjunction with a rotation of the second pulley 422*c*. The belt 422*e* according to the present embodiment may be formed to have a band shape having a closed curve. The belt 422*e* may be made of an elastically deformable material such as rubber. The belt 422*e* may be disposed so that two opposite inner surfaces of the belt 422*e* surround the outer surface of the first pulley 422*a* and the outer surface of the second pulley 422*c*. Belt teeth 422*f* may protrude from the inner surface of the belt 422*e* and engage with the first teeth 422*b* and the second teeth 422*d*. Therefore, the belt 422*e* may convert a rotational motion of the rotary shaft 421 into a rotational motion of the steering knuckle 200 about the central axis C1 of the stationary shaft 300. In this process, a predetermined interval is maintained between the central axis C1 of the stationary shaft 300 and the central axis C2 of the actuator 410 by the second extension portion 230, such that the actuator 410 may revolve around the stationary shaft 300 when the steering knuckle 200 rotates.

The casing 423 is coupled to the steering knuckle 200 and covers the power transmission member 420. The casing 423 according to the present embodiment may be formed to have a hollow container shape opened at an upper side thereof. The casing 423 may be disposed so that the upper opened side of the casing 423 faces the lower surface of the second extension portion 230. An upper surface of the casing 423 may be coupled to the lower surface of the second extension portion 230 by welding, bolting, or the like. The power transmission member 420 may be accommodated in the casing 423. Therefore, the casing 423 may protect the power transmission member 420 from external impact, foreign substances, or the like.

The corner module apparatus 1 for a vehicle according to the present embodiment may further include a suspension arm 500, a connection member 600, and a shock absorber module 700.

The suspension arm 500 is provided between the steering knuckle 200 and the vehicle body 2 and supports the steering knuckle 200 on the vehicle body 2. More specifically, the suspension arm 500 connects the wheel 2 to the vehicle body 2 by means of the steering knuckle 200 and absorbs a load applied from the wheel 3 by using rigidity thereof while the vehicle travels. Further, the suspension arm 500 serves to adjust a motion of the wheel 3.

The suspension arm 500 according to the present embodiment may include a first suspension arm 510 and a second suspension arm 520.

The first suspension arm 510 and the second suspension arm 520 are disposed to be spaced apart from each other in the height direction of the vehicle body 2 and independently support two opposite upper and lower sides of the steering knuckle 200 on the vehicle body 2.

Hereinafter, an example will be described in which the first suspension arm 510 supports the upper side of the steering knuckle 200, and the second suspension arm 520 supports the lower side of the steering knuckle 200. However, the first suspension arm 510 and the second suspension arm 520 are not limited thereto. The first suspension arm 510 may support the lower side of the steering knuckle 200, and the second suspension arm 520 may support the upper side of the steering knuckle 200.

The first suspension arm 510 is disposed between the vehicle body 2 and the steering knuckle 200 and supports the upper side of the steering knuckle 200.

The first suspension arm 510 according to the present embodiment may be formed to have an approximately wishbone arm. One end of the first suspension arm 510 may be rotatably connected to the vehicle body 2 by a bushing, a ball joint, or the like, and the other end of the first suspension arm 510 may be rotatably connected to the end of the first extension portion 220 by a bushing, a ball joint, or the like.

The second suspension arm 520 is disposed to be spaced apart from the first suspension arm 510 and supports the lower side of the steering knuckle 200. One end of the second suspension arm 520 may be rotatably connected to the vehicle body 2 by a bushing, a ball joint, or the like. The second suspension arm 520 may be disposed to be spaced apart from the stationary shaft 300 and indirectly connected to the lower end of the stationary shaft 300 protruding downward from the second extension portion 230 by means of the connection member 600 to be described below.

The second suspension arm 520 according to the present embodiment may include a first link 521 and a second link 522.

The first link 521 and the second link 522 are disposed to be spaced apart from each other and independently support the lower side of the steering knuckle 200 on the vehicle body 2. Therefore, when the wheel 3 is steered or bumped and rebounded, the first link 521 and the second link 522 may more easily absorb a deformation load as installation angles of the first link 521 and the second link 522 with respect to the vehicle body 2 are independently adjusted. The first link 521 and the second link 522 according to the present embodiment may each be formed in the form of various types of suspension arms such as a wishbone arm and a link arm.

One end of each of the first and second links 521 and 522 may be rotatably connected to the vehicle body 2 by a bushing, a ball joint, or the like. The other end of the first link 521 and the other end of the second link 522 may be disposed to be spaced apart from the stationary shaft 300 in the width direction of the vehicle body 2 and indirectly connected to the lower end of the stationary shaft 300 protruding downward from the second extension portion 230 by means of the connection member 600 to be described below.

The connection member 600 is provided between the second suspension arm 520 and the stationary shaft 300 and connects the second suspension arm 520 and the stationary shaft 300. More specifically, the connection member 600 serves as a component for connecting the other end of the first link 521 and the other end of the second link 522 to the lower end of the stationary shaft 300 at a position at which the other end of the first link 521 and the other end of the second link 522 are spaced apart from each other in the width direction of the vehicle body 2. Therefore, the connection member 600 may position the lower end of the stationary shaft 300 at a point closer to the wheel 3 while separating the lower end of the stationary shaft 300 from the first link 521 and the second link 522, thereby reducing the kingpin offset and improving the traveling stability.

Figure 9:
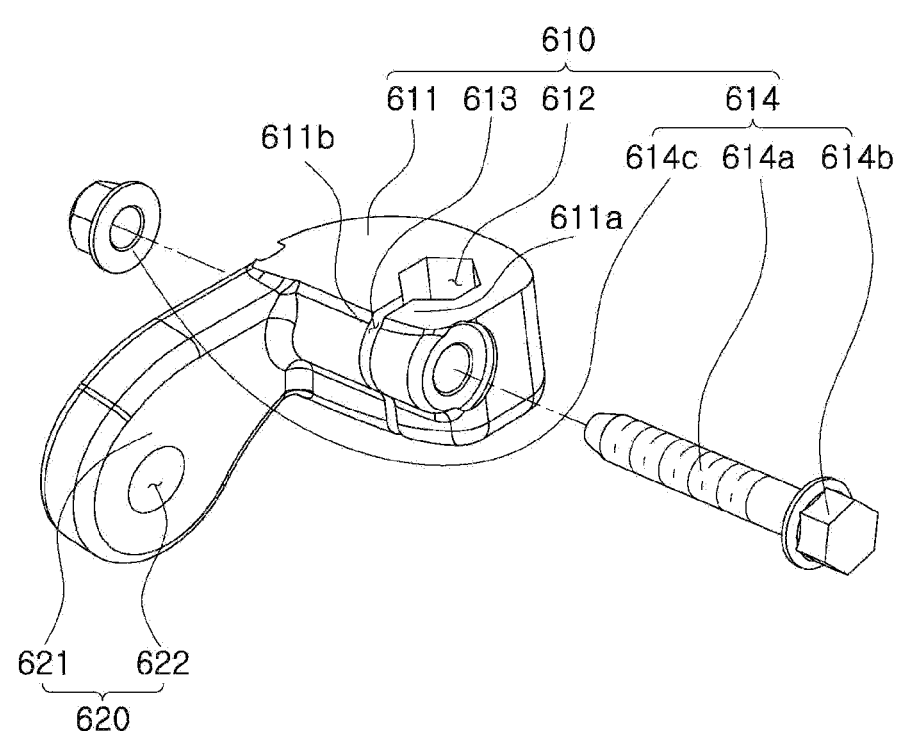
FIG. 9 is a perspective view schematically illustrating a configuration of a connection member according to the embodiment of the present disclosure.
Figure 10:
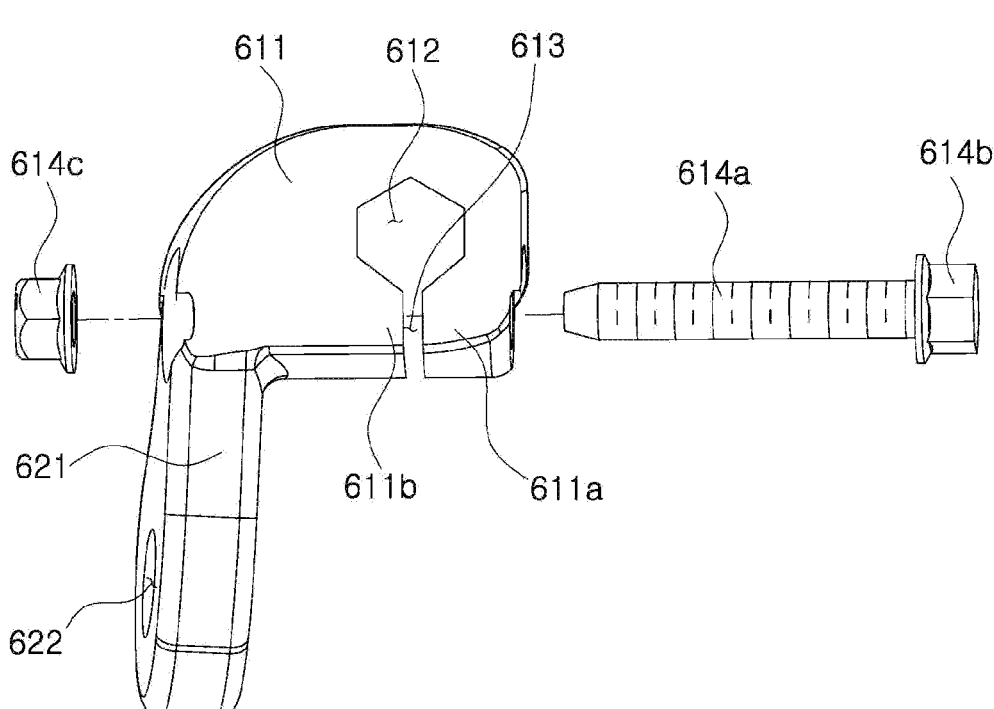
FIG. 10 is a top plan view schematically illustrating the configuration of the connection member according to the embodiment of the present disclosure.
Figure 11:
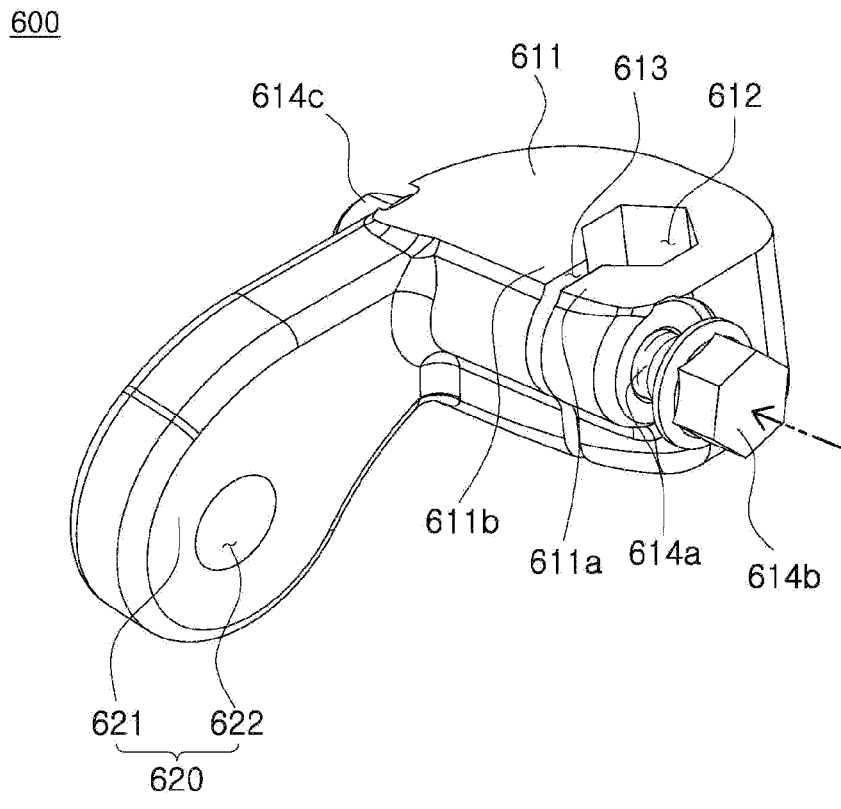
FIGS. 11 and 12 are views schematically illustrating a process of operating the connection member according to the embodiment of the present disclosure.
Figure 12:
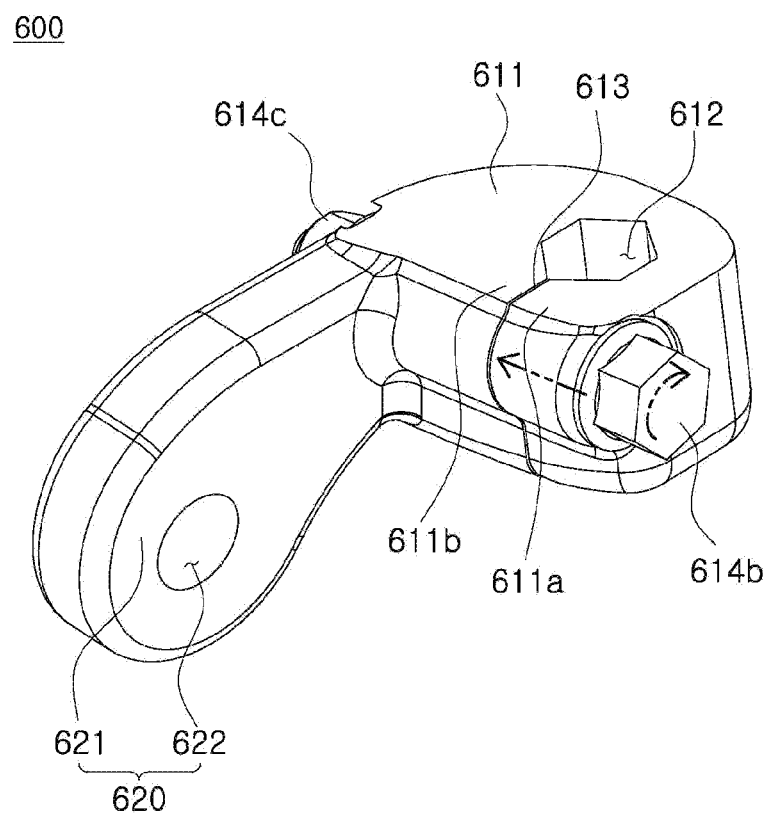

FIG. 9 is a perspective view schematically illustrating a configuration of a connection member according to the embodiment of the present disclosure, FIG. 10 is a top plan view schematically illustrating the configuration of the connection member according to the embodiment of the present disclosure, and FIGS. 11 and 12 are views schematically illustrating a process of operating the connection member according to the embodiment of the present disclosure.

With reference to FIGS. 9 to 12, the connection member 600 according to the present embodiment may include a first connection member 610 and a second connection member 620.

The first connection member 610 defines an external appearance of one side of the connection member 600 and is connected to the stationary shaft 300.

The first connection member 610 according to the present embodiment may include a first body 611, an insertion hole 612, and a slit 613.

The first body 611 entirely supports the insertion hole 612 and the slit 613, which will be described below, and is disposed to face the lower side of the steering knuckle 200. The first body 611 according to the present embodiment may be disposed below the steering knuckle 200, and an upper surface of the first body 611 may be disposed to face a lower surface of the casing 423. The first body 611 may be made of an elastically deformable material such as plastic or synthetic resin. The specific shape of the first body 611 is not limited to the shape illustrated in FIG. 9 but may be designed and modified in various shapes.

A casing bearing 601 may be installed between the casing 423 and the first body 611 and support the casing 423 on the first body 611 so that the casing 423 is rotatable. The casing bearing 601 according to the present embodiment may be disposed so that a central axis of the casing bearing 601 is positioned coaxially with the central axis C1 of the stationary shaft 300. The casing bearing 601 may be exemplified by various types of thrust bearings each including a pair of bearing bodies disposed to face each other along the central axis C1 of the stationary shaft 300, and rolling elements such as balls or needles disposed between the pair of bearing bodies. The pair of bearing bodies may be respectively fixed to the casing 423 and the first body 611. Therefore, the casing bearing 601 may reduce a frictional force applied between the casing 423 and the first body 611 and suppress vibration, noise, or the like occurring while the steering knuckle 200 rotates.

The insertion hole 612 is formed through the first body 611, and the stationary shaft 300 is inserted into the insertion hole 612. The insertion hole 612 according to the present embodiment may be formed to have a hole shape formed through the first body 611 in an upward/downward direction. The lower end of the stationary shaft 300 may be inserted into the insertion hole 612. The insertion hole 612 may be formed to have various cross-sectional shapes such as a polygonal or elliptical cross-sectional shape instead of a circular cross-sectional shape. A cross-sectional shape of the lower end of the stationary shaft 300 may also correspond to the cross-sectional shape of the insertion hole 612. Therefore, the insertion hole 612 may prevent the stationary shaft 300 inserted into the insertion hole 612 from rotating about the central axis C1.

The slit 613 is formed through the first body 611 and extends toward the insertion hole 612 from a peripheral surface of the first body 611. The slit 613 according to the present embodiment may be formed to have a hole shape that divides the peripheral surface of the first body 611 into two opposite surfaces. Inner and outer surfaces of the slit 613 may respectively communicate with an internal space of the insertion hole 612 and an external space of the first body 611. Two opposite upper and lower sides of the slit 613 may be respectively formed through upper and lower surfaces of the first body 611. In this case, the first body 611 may have a first end 611a and a second end 611b disposed to face each other with the slit 613 interposed therebetween. Therefore, a size of a cross-sectional area of the insertion hole 612 may be freely adjusted by a change in interval between the first end 611a and the second end 611b, and the stationary shaft 300 may be more smoothly inserted into the insertion hole 612.

The first connection member 610 according to the present embodiment may further include an adjustment member 614.

The adjustment member 614 is movably connected to the first body 611, and a width of the slit 613 is adjusted depending on a movement direction of the adjustment member 614. That is, the adjustment member 614 may serve as a component for changing a close contact state of the first body 611 with the stationary shaft 300 by adjusting the interval between the first end 611a and the second end 611b. Therefore, after the stationary shaft 300 is inserted into the insertion hole 612, the adjustment member 614 may securely fix the first body 611 to the stationary shaft 300.

The adjustment member 614 according to the present embodiment may include an adjustment rod 614a, an adjustment head 614b, and an adjustment nut 614c.

The adjustment rod 614a may be formed to have a rod shape having a circular cross-section. One end of the adjustment rod 614a may sequentially penetrate the first end 611a and the slit 613 and be inserted into the second end 611b. A screw thread may be formed on an outer peripheral surface of the adjustment rod 614a. In case that one end of the adjustment rod 614a is completely inserted into the second end 611b, one end of the adjustment rod 614a may protrude outward from the second end 611b by a predetermined distance.

The adjustment head 614b is disposed at one side of the adjustment rod 614a and presses the first end 611a toward the second end 611b as the adjustment rod 614a is inserted into the second end 611b. The adjustment head 614b according to the present embodiment may be disposed at the other end of the adjustment rod 614a, i.e., the side opposite to one end of the adjustment rod 614a that is inserted into the second end 611b. The adjustment head 614b may be disposed so that a central axis of the adjustment head 614b is positioned coaxially with a central axis of the adjustment rod 614a. A cross-sectional area of the adjustment head 614b may be larger than a cross-sectional area of the adjustment head 614b. When the adjustment rod 614a is inserted into the second end 611b, an inner surface of the adjustment head 614b may come into contact with an outer surface of the second end 611b.

The adjustment nut 614c is disposed at the other side of the adjustment rod 614a and prevents the adjustment rod 614a from separating from the second end 611b. The adjustment nut 614c may be detachably coupled to the adjustment rod 614a. The adjustment nut 614c according to the present embodiment may be formed to have a hollow nut shape having a screw thread formed on an inner peripheral surface thereof. An inner peripheral surface of the adjustment nut 614c may be screw-coupled to an outer peripheral surface of one end of the adjustment rod 614a protruding outward from the second end 611b. One surface of the adjustment nut 614c may be in contact with an outer surface of the first end 611a. Therefore, the adjustment nut 614c may prevent the adjustment rod 614a from separating from the second end 611b and maintain a pressing force applied by the adjustment head 614b to press the second end 611b toward the first end 611a.

The second connection member 620 extends from the first connection member 610 and is connected to the second suspension arm 520.

The second connection member 620 according to the present embodiment may include a second body 621 and a fastening hole 622.

The second body 621 may be formed to have a rod shape extending in the width direction of the vehicle body 2 from the first connection member 610, more specifically, an outer surface of the first body 611. The first link 521 and the second link 522 may be disposed to be spaced apart from each other with the second body 621 interposed therebetween.

The fastening hole 622 may be formed to have a hole shape formed through the second body 621. Two opposite sides of the fastening hole 622 may be disposed to face the other end of the first link 521 and the other end of the second link 522. The other end of the first link 521 may be connected to one side of the fastening hole 622 by a bushing, a ball joint, or the like. The other end of the second link 522 may be connected to the other side of the fastening hole 622 by a bushing, a ball joint, or the like.

The shock absorber module 700 is connected to the suspension arm 500 and absorbs impact applied from the road surface.

The shock absorber module 700 according to the present embodiment may include a damper 710 and a leaf spring 720.

The damper 710 extends in the height direction of the vehicle body 2 and is provided to be extendable and contractible in a length direction thereof. The damper 710 according to the present embodiment may be exemplified by various types of buffer means each including a cylinder having an interior filled with a damping fluid and having a lower end rotatably connected to the second suspension arm 520, more specifically, the upper surface of the first link 521 or the upper surface of the second link 522, and a damping rod having a lower end slidably inserted into the cylinder, and the other side coupled to the vehicle body 2. A length direction of the damper 710 may be disposed to be inclined at a predetermined angle with respect to the ground surface.

The leaf spring 720 extends in the width direction of the vehicle body 2 and is provided to be elastically deformable. The leaf spring 720 according to the present embodiment may be formed to have a flat spring shape. A lower surface of the leaf spring 720 may be seated and supported on the second suspension arm 520, more specifically, the upper surface of the first link 521 or the upper surface of the second link 522. One end of the leaf spring 720 may be fixed to the vehicle body 2 by welding, bolting, or the like. When the second suspension arm 520 is rotated by a bump or rebound motion of the wheel 3, the leaf spring 720 may be elastically deformed in the upward/downward direction, thereby canceling out impact applied from the road surface.

The corner module apparatus 1 for a vehicle according to the present embodiment may further include a braking unit 800.

The braking unit 800 is provided between the drive unit 100 and the steering knuckle 200 and applies a braking force to the vehicle or cuts off the application of the braking force while interfering with the rotation of the wheel 3.

The braking unit 800 according to the present embodiment may include a brake disc 810 and a brake caliper 820.

The brake disc 810 is connected to the wheel 3 or the drive unit 100 and rotates in conjunction with the rotation of the wheel 3. The brake disc 810 according to the embodiment may be formed to have a circular plate shape and installed inside the wheel 3. The brake disc 810 may be disposed so that a central axis of the brake disc 810 is positioned on the same line as the central axis of the wheel 3. The brake disc 810 may be integrally connected to the wheel 3 or the rotor of the drive unit 100 by bolting or the like. Therefore, when the wheel 3 rotates, the brake disc 810 may rotate about the central axis together with the wheel 3. A diameter of the brake disc 810 may be variously designed and modified based on a diameter of the wheel 3, a size of the drive unit 100, or the like.

The brake caliper 820 applies the braking force by pressing the brake disc 810 at the time of braking the vehicle. The brake caliper 820 according to the present embodiment may include a brake pad disposed to face the brake disc 810, a caliper housing coupled to the steering knuckle 200 and configured to support the brake pad so that the brake pad is movable, and a piston installed in the caliper housing and configured to be extended or retracted, the piston being configured to press the brake pad toward the brake disc 810 or release the brake pad depending on a movement direction thereof.

Hereinafter, an operation of the corner module apparatus 1 for a vehicle according to the embodiment of the present disclosure will be described in detail.

Figure 13:
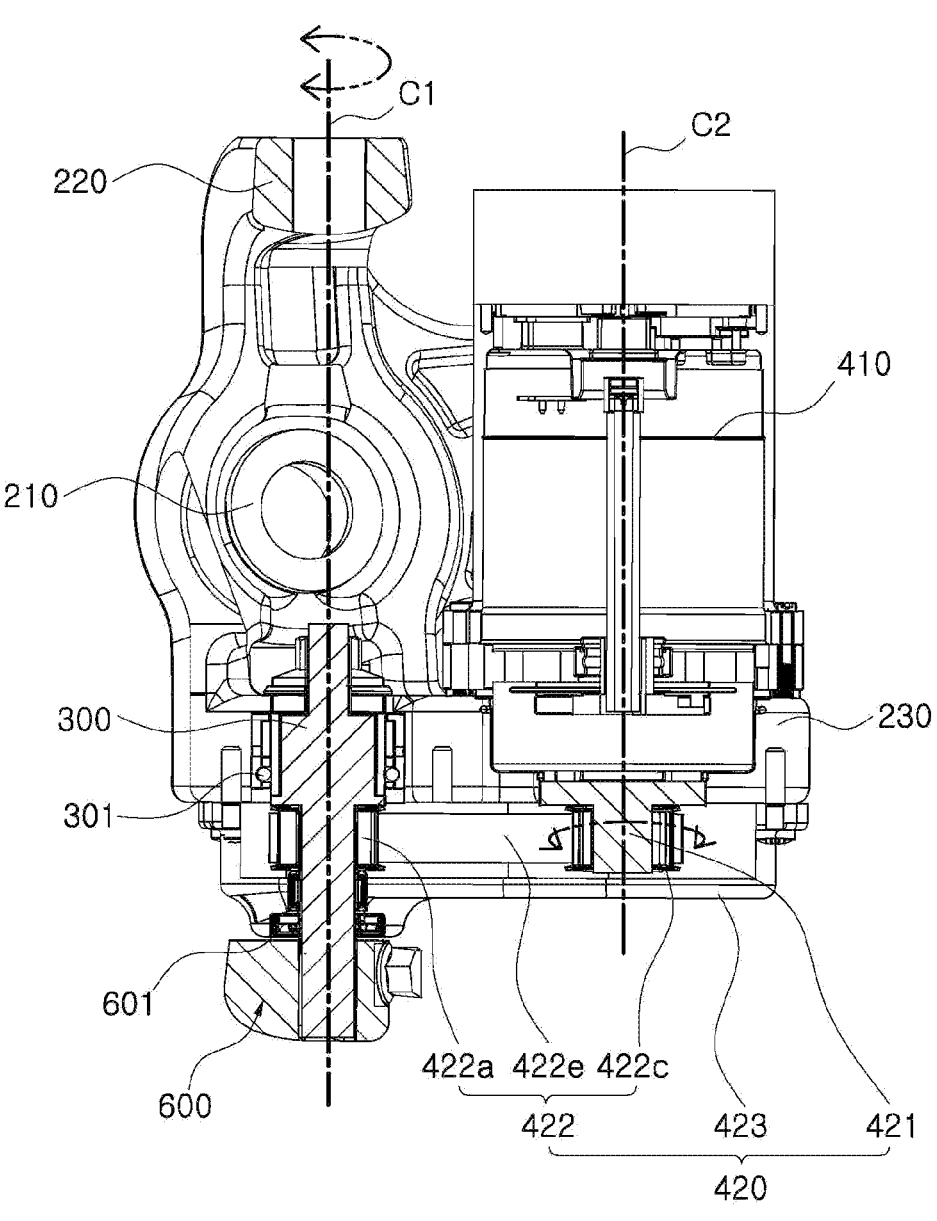
FIGS. 13, 14, and 15 are views schematically illustrating a process of operating the corner module apparatus according to the embodiment of the present disclosure.
Figure 14:
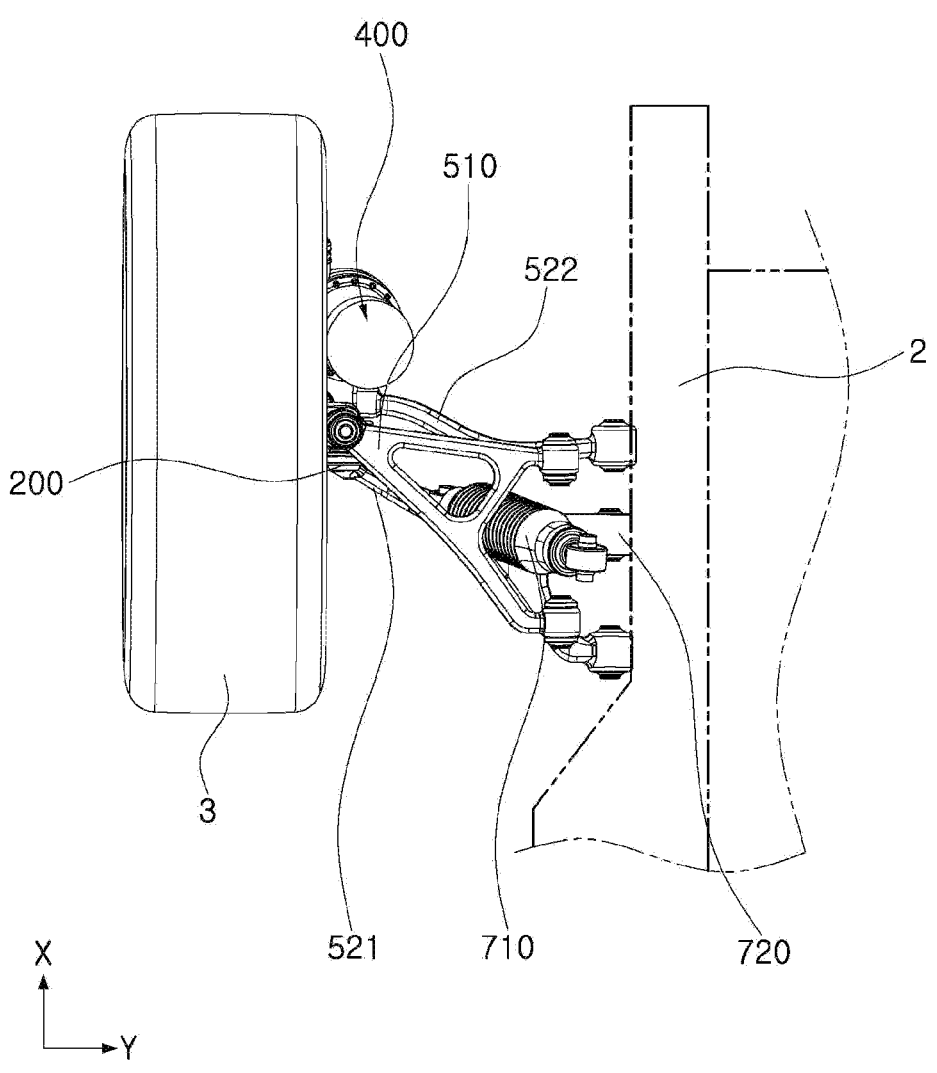
Figure 15:
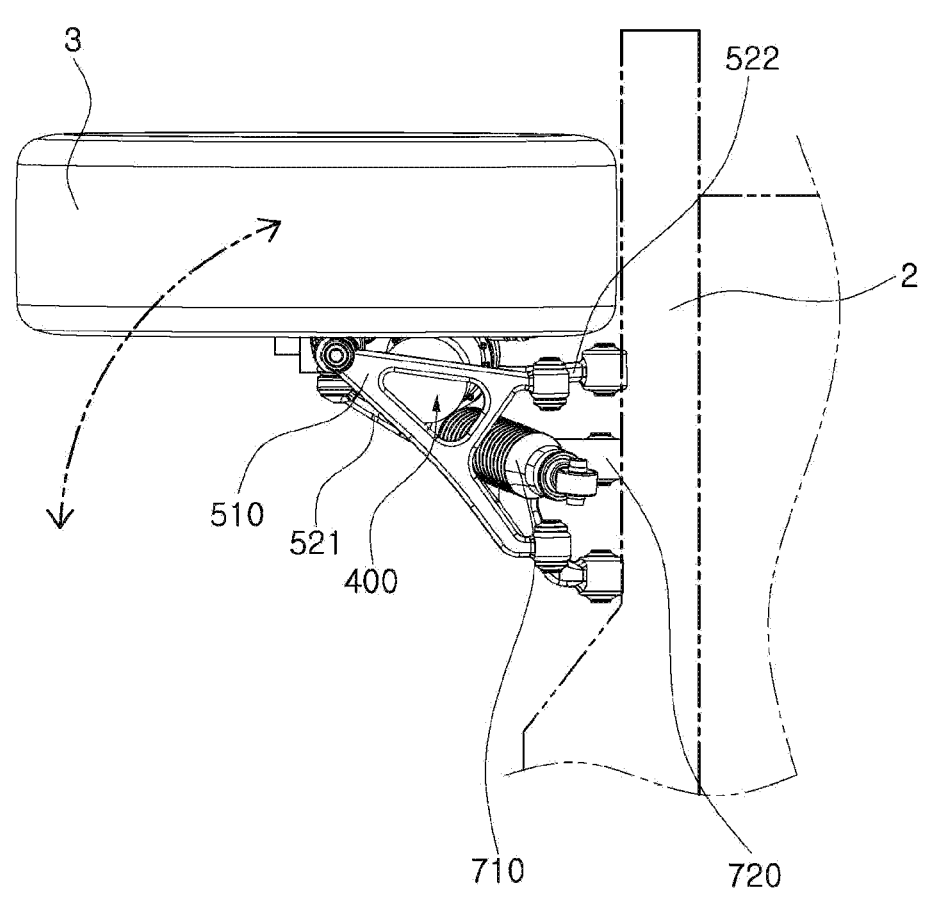
Figure 15:
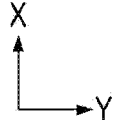

FIGS. 13 to 15 are views schematically illustrating a process of operating the corner module apparatus according to the embodiment of the present disclosure.

With reference to FIGS. 13 to 15, the actuator 410 generates a rotational force in one direction in order to steer the vehicle.

The rotational force generated by the actuator 410 is transmitted to the rotary shaft 421, and the rotary shaft 421 rotates about the central axis C2 of the actuator 410.

The second pulley 422c rotates about the central axis C2 of the actuator 410 together with the rotary shaft 421.

The first pulley 422a is fixed to the stationary shaft 300 so as not to be rotatable, and the outer surface of the second pulley 422c engages with the inner surface of the belt 422e. Therefore, when the second pulley 422c rotates, tensions with different magnitudes are applied to the belt 422_e_ disposed at two opposite sides based on the second pulley 422_c_.

The rotational force about the central axis C1 of the stationary shaft 300 is applied to the second pulley 422_c_ and the rotary shaft 421 by the above-mentioned difference in tension.

The actuator 410 is rotated about the central axis C1 of the stationary shaft 300 by the rotational force applied to the rotary shaft 421.

In this case, the predetermined interval between the stationary shaft 300 and the rotary shaft 421 is maintained by the steering knuckle 200, such that the actuator 410 revolves around the central axis C1 of the stationary shaft 300.

Meanwhile, the second pulley 422_c_ is rotated by the rotational force generated by the actuator 410 while revolving around the central axis C1 of the stationary shaft 300 together with the actuator 410. The belt 422_e_ is moved in an endless track manner by the rotation and revolution of the second pulley 422_c_ while maintaining the state in which the belt 422_e_ engages with the first pulley 422_a_ and the second pulley 422_c_.

Because the actuator 410 is integrally coupled to the steering knuckle 200, the steering knuckle 200 changes the steering angle of the wheel 3 while being rotated about the central axis C1 of the stationary shaft 300 by the rotational force applied to the rotary shaft 421.

While the present disclosure has been described with reference to the embodiment illustrated in the drawings, the embodiment is only for illustrative purpose, and those skilled in the art to which the present technology pertains will understand that various modifications of the embodiment and any other embodiment equivalent thereto are available. Accordingly, the true technical protection scope of the present disclosure should be defined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A corner module apparatus comprising:
   a drive unit installed inside a wheel and configured to provide driving power to the wheel;
   a steering knuckle connected to the drive unit;
   a stationary shaft configured to support the steering knuckle so that the steering knuckle is rotatable;
   an actuator fixed to a first surface of the steering knuckle and configured to generate a rotational force; and
   a power transmission member that penetrates the steering knuckle through a second surface of the steering knuckle opposite the first surface and is connected to the actuator and configured to rotate the steering knuckle about the stationary shaft in conjunction with the rotational force generated by the actuator.

2. The corner module apparatus of claim 1, wherein a central axis of the stationary shaft is inclined with respect to a ground surface.

3. The corner module apparatus of claim 1, wherein when the steering knuckle rotates, the actuator revolves around a central axis of the stationary shaft.

4. The corner module apparatus of claim 3, wherein a central axis of the actuator is spaced apart from the central axis of the stationary shaft.

5. The corner module apparatus of claim 4, wherein the central axis of the actuator is parallel with the central axis of the stationary shaft.

6. The corner module apparatus of claim 1, wherein the power transmission member comprises:
   a rotary shaft connected to the actuator and configured to rotate by receiving the rotational force from the actuator; and
   a conversion member disposed between the stationary shaft and the rotary shaft and configured to convert a rotational motion of the rotary shaft into a rotational motion of the steering knuckle.

7. The corner module apparatus of claim 6, wherein the conversion member comprises:
   a first pulley fixed to the stationary shaft;
   a second pulley spaced apart from the first pulley and configured to rotate together with the rotary shaft; and
   a belt disposed to surround the first pulley and the second pulley and having an inner surface that engages with an outer surface of the first pulley and an outer surface of the second pulley.

8. The corner module apparatus of claim 1, further comprising:
   a knuckle bearing disposed between the steering knuckle and the stationary shaft and configured to guide a rotation of the steering knuckle relative to the stationary shaft.

9. The corner module apparatus of claim 1, further comprising:
   a suspension arm disposed between a vehicle body and the steering knuckle and configured to support the steering knuckle on the vehicle body; and
   a shock absorber module connected to the suspension arm and configured to absorb impact applied from a road surface.

10. The corner module apparatus of claim 9, wherein the shock absorber module comprises:
    a damper extending in a height direction of the vehicle body and configured to be extendable and contractible in a length direction thereof; and
    a leaf spring extending in a width direction of the vehicle body and configured to be elastically deformable.

11. A corner module apparatus comprising:
    a drive unit installed inside a wheel and configured to provide driving power to the wheel;
    a steering knuckle connected to the drive unit;
    a stationary shaft configured to support the steering knuckle so that the steering knuckle is rotatable;
    a steering unit connected to the steering knuckle and configured to rotate the steering knuckle relative to the stationary shaft;
    a first suspension arm disposed between a vehicle body and the steering knuckle and configured to support a first side of the steering knuckle on the vehicle body;
    a second suspension arm spaced apart from the stationary shaft and configured to support a second side of the steering knuckle on the vehicle body; and
    a connection member disposed between the second suspension arm and the stationary shaft and configured to connect the second suspension arm to the stationary shaft.

12. The corner module apparatus of claim 11, wherein the connection member comprises:
    a first connection member connected to the stationary shaft; and a second connection member extending from the first connection member and connected to the second suspension arm.

13. The corner module apparatus of claim 12, wherein the first connection member comprises:

a first body disposed to face the second side of the steering knuckle;

an insertion hole formed through the first body so that the stationary shaft is inserted into the insertion hole; and a slit formed through the first body and extending toward the insertion hole from a peripheral surface of the first body.

14. The corner module apparatus of claim 13, wherein the first body is configured to be elastically deformable.

15. The corner module apparatus of claim 13, wherein a cross-sectional shape of the insertion hole is any one of a polygonal shape and an elliptical shape.

16. The corner module apparatus of claim 13, wherein the first connection member further comprises an adjustment member movably connected to the first body and configured to adjust a width of the slit depending on a movement direction thereof.

17. The corner module apparatus of claim 16, wherein the first body comprises a first end and a second end disposed to face each other with the slit interposed therebetween, and wherein the adjustment member comprises:

an adjustment rod configured to penetrate the first end and the slit and be inserted into the second end;

an adjustment head disposed at a first side of the adjustment rod and configured to press the first end toward the second end when the adjustment rod is inserted into the second end; and an adjustment nut disposed at a second side of the adjustment rod and configured to prevent the adjustment rod from separating from the second end.

18. The corner module apparatus of claim 17, wherein the adjustment nut is detachably coupled to the adjustment rod.

19. The corner module apparatus of claim 12, wherein the second connection member comprises:

a second body extending from the first connection member in a width direction of the vehicle body; and a fastening hole formed through the second body and connected to the second suspension arm.

20. The corner module apparatus of claim 19, wherein the second suspension arm comprises:

a first link connected to a first side of the fastening hole; and a second link spaced apart from the first link with the second body interposed therebetween, the second link being connected to a second side of the fastening hole.

\* \* \* \* \*